(12) United States Patent
Chaudhry et al.

(10) Patent No.: US 7,571,304 B2
(45) Date of Patent: Aug. 4, 2009

(54) GENERATION OF MULTIPLE CHECKPOINTS IN A PROCESSOR THAT SUPPORTS SPECULATIVE EXECUTION

(75) Inventors: Shailender Chaudhry, San Francisco, CA (US); Marc Tremblay, Menlo Park, CA (US); Paul Caprioli, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 259 days.

(21) Appl. No.: 11/084,655

(22) Filed: Mar. 18, 2005

(65) Prior Publication Data

US 2006/0212688 A1    Sep. 21, 2006

(51) Int. Cl.
*G06F 15/00* (2006.01)
*G06F 7/38* (2006.01)
*G06F 9/00* (2006.01)
*G06F 9/44* (2006.01)

(52) U.S. Cl. .................................................. 712/228
(58) Field of Classification Search .............. 712/228; 711/144
See application file for complete search history.

(56) References Cited

U.S. PATENT DOCUMENTS

| 5,659,721 | A | * | 8/1997 | Shen et al. .................. 712/228 |
| 6,691,240 | B1 | | 2/2004 | Stotzer et al. |
| 2004/0226011 | A1 | | 11/2004 | Augsburg et al. |
| 2004/0230778 | A1 | * | 11/2004 | Chou et al. .................. 712/228 |
| 2005/0247774 | A1 | * | 11/2005 | Sander et al. ............... 235/375 |

FOREIGN PATENT DOCUMENTS

| EP | 0 355 286 | 2/1990 |
| EP | 0779577 A2 | 6/1997 |
| WO | WO 03/093982 | 11/2003 |

OTHER PUBLICATIONS

Lebeck et al.; A Large, Fast Instruction Window for Tolerating Cache Misses; May 2002; pp. 59-69.*
Lebeck et al, A Large Fast Instruction Window for Tolerating Cache Misses, May 2002, pp. 59-69.*
Dundas et al., Improving Data Cache Performance by Pre-executing Instructions Under a Cache Miss, 1997, pp. 68-75.*
Iffat H. Kazi et al., "Coarse-Grained Speculative Execution in Shared-Memory Multiprocessors", ICS 98 Melbourne Australia, published Jul. 7, 1998, XP-000895361, pp. 93-100.
Daniel C. McCrackin, "Eliminating Interlocks in Deeply Pipelined Processors by Delay Enforced Multistreaming", IEEE Transactions on Computers 40 (1991) October, No. 10, New York, US, XP 000266019.

* cited by examiner

*Primary Examiner*—Eddie P Chan
*Assistant Examiner*—George D Giroux
(74) *Attorney, Agent, or Firm*—Park, Vaughan & Fleming LLP; Anthony P. Jones (57) ABSTRACT

One embodiment of the present invention provides a system which creates multiple checkpoints in a processor that supports speculative-execution. The system starts by issuing instructions for execution in program order during execution of a program in a normal-execution mode. Upon encountering a launch condition during an instruction which causes a processor to enter execute-ahead mode, the system performs an initial checkpoint and commences execution of instructions in execute-ahead mode. Upon encountering a predefined condition during execute-ahead mode, the system generates an additional checkpoint and continues to execute instructions in execute-ahead mode. Generating the additional checkpoint allows the processor to return to the additional checkpoint, instead of the previous checkpoint, if the processor subsequently encounters a condition that requires the processor to return to a checkpoint.

16 Claims, 4 Drawing Sheets

REGISTER FILE COPIES 500

|    | RF0 | RF1 | RF2 | RF3 |
|----|-----|-----|-----|-----|
| R0 | AC  |     |     |     |
| R1 | AC  |     |     |     |
| R2 | AC  |     |     |     |
| R3 | AC  |     |     |     |
| R4 | AC  |     |     |     |
| R5 | AC  |     |     |     |

HR AND HW TABLE 501

|    | HR | HW1 | HW2 | HW3 |
|----|----|-----|-----|-----|
| R0 | 0  |     |     |     |
| R1 | 0  |     |     |     |
| R2 | 0  |     |     |     |
| R3 | 0  |     |     |     |
| R4 | 0  |     |     |     |
| R5 | 0  |     |     |     |

INITIAL STATE

FIG. 5A

REGISTER FILE COPIES 502

|    | RF0 | RF1 | RF2 | RF3 |
|----|-----|-----|-----|-----|
| R0 | AC  |     |     |     |
| R1 | AC  | SW  |     |     |
| R2 | AC  |     | SW  |     |
| R3 | AC  |     |     |     |
| R4 | AC  | SW  |     | SW  |
| R5 | AC  |     |     |     |

HR AND HW TABLE 503

|    | HR | HW1 | HW2 | HW3 |
|----|----|-----|-----|-----|
| R0 | 0  |     |     |     |
| R1 | 0  | 1   |     |     |
| R2 | 0  |     | 1   |     |
| R3 | 0  |     |     |     |
| R4 | 0  | 1   |     | 1   |
| R5 | 0  |     |     |     |

AFTER WRITING FOLLOWING THE THIRD CHECKPOINT

FIG. 5B

REGISTER FILE COPIES 504

|    | RF0 | RF1 | RF2 | RF3 |
|----|-----|-----|-----|-----|
| R0 | AC  |     |     |     |
| R1 |     | AC  |     |     |
| R2 |     |     | AC  |     |
| R3 | AC  |     |     |     |
| R4 |     |     |     | AC  |
| R5 | AC  |     |     |     |

HR AND HW TABLE 505

|    | HR | HW1 | HW2 | HW3 |
|----|----|-----|-----|-----|
| R0 | 0  |     |     |     |
| R1 | 1  |     |     |     |
| R2 | 2  |     |     |     |
| R3 | 0  |     |     |     |
| R4 | 3  |     |     |     |
| R5 | 0  |     |     |     |

UPON RETURNING TO NORMAL EXECUTION MODE

FIG. 5C

GENERATION OF MULTIPLE CHECKPOINTS IN A PROCESSOR THAT SUPPORTS SPECULATIVE EXECUTION

BACKGROUND

1. Field of the Invention

The present invention relates to techniques for improving the performance of computer systems. More specifically, the present invention relates to a method and apparatus for generating multiple checkpoints in a processor that supports speculative-execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

When a memory reference, such as a load operation, generates a cache miss, the subsequent access to level-two (L2) cache (or memory) can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers that can be used for register renaming purposes during out-of-order execution also limit the effective size of the issue queue.

Some processor designers have proposed using speculative-execution to avoid the pipeline stalls associated with cache misses. Two such proposed speculative-execution modes are: (1) execute-ahead mode and (2) scout mode.

Execute-ahead mode operates as follows. During normal execution, the system issues instructions for execution in program order. Upon encountering an unresolved data dependency during execution of an instruction, the system generates a checkpoint that can be used to return execution of the program to the point of the instruction. Next, the system executes subsequent instructions in the execute-ahead mode, wherein instructions that cannot be executed because of an unresolved data dependency are deferred, and wherein other non-deferred instructions are executed in program order.

If the unresolved data dependency is resolved during execute-ahead mode, the system enters a deferred execution mode, wherein the system executes deferred instructions. If all deferred instructions are executed during this deferred execution mode, the system returns to normal-execution mode to resume normal program execution from the point where the execute-ahead mode left off. Alternatively, if all deferred instructions are not executed, the system returns to execute-ahead mode until the remaining unresolved data dependencies are resolved and the deferred instructions can be executed.

If the system encounters a non-data-dependent stall condition while executing in normal mode or execute-ahead mode, the system moves into scout mode. In scout mode, instructions are speculatively executed to prefetch future loads, but results are not committed to the architectural state of the processor. When the launch point stall condition (the unresolved data dependency or the non-data dependent stall condition that originally caused the system to move out of normal-execution mode) is finally resolved, the system uses the checkpoint to resume execution in normal mode from the launch point instruction (the instruction that originally encountered the launch point stall condition).

By allowing a processor to continue to perform work during stall conditions, speculative-execution can significantly increase the amount of computational work the processor completes.

Unfortunately, the gains in computational work achieved using execute-ahead mode can be lost when the processor encounters a condition which requires the processor to return to a remote checkpoint (a checkpoint which was generated many instructions beforehand). During execute-ahead mode the processor can potentially execute thousands of instructions. Upon returning to the remote checkpoint, the processor discards the results of these speculatively executed instructions and must eventually re-compute the instructions during normal execution mode. When forced to redo this large amount of computational work, the processor loses the main benefit of execute-ahead mode.

Hence, what is needed is a mechanism that prevents the loss of a large amount of computational work when a processor returns to a checkpoint during execute-ahead mode.

SUMMARY

One embodiment of the present invention provides a system which creates multiple checkpoints in a processor that supports speculative-execution. The system starts by issuing instructions for execution in program order during execution of a program in a normal-execution mode. Upon encountering a launch condition during an instruction which causes a processor to enter execute-ahead mode, the system performs an initial checkpoint and commences execution of instructions in execute-ahead mode. Upon encountering a predefined condition during execute-ahead mode, the system generates an additional checkpoint and continues to execute instructions in execute-ahead mode. Generating the additional checkpoint allows the processor to return to the additional checkpoint, instead of the previous checkpoint, if the processor subsequently encounters a condition that requires the processor to return to a checkpoint. Returning to the additional checkpoint prevents the processor from having to re-execute instructions between the previous checkpoint and the additional checkpoint.

In a variation of this embodiment, the processor contains a number of copies of a register file, and the number of copies N of the register file is equal to the number of checkpoints supported by the processor, plus one for the architecturally committed copy of the register file.

In a variation of this embodiment, each register has a pointer "HR" that indicates which copy of the register file contains the architecturally committed version of the register. The HR pointer for each register may point at a different copy of the register file.

In a further variation, each checkpoint supported by the processor has an associated variable "HW" for each register. The processor sets the associated HW variable when the register is speculatively written to following the generation of an associated checkpoint.

In a further variation, the processor reads from a given register in the register file copy using the formula (HR+HW) % N to determine which register to read.

In a variation of this embodiment, the processor maintains a state machine which holds an offset value specifying the number of checkpoints that have been generated. This offset value is zero during normal-execution mode.

In a variation of this embodiment, when writing to a register, the processor locates the register within the copies of the register file using the HR pointer and the offset value.

In a variation of this embodiment, generating a checkpoint involves storing the program counter; advancing the state machine; and tagging store buffer entries with pending stores with a checkpoint identifier which causes the processor to block global visibility of stores generated during speculative execution.

In a variation of this embodiment, when the condition which caused the processor to take the checkpoint clears, the processor "joins" the results of the instructions executed in speculative-execution mode with the current architectural state of the processor by shifting the HR pointer for each register to point at the register file copy used during the checkpoint if the associated HW variable for that register is set; unsetting the associated HW variables; releasing the store buffer entries associated with this checkpoint to become globally visible; and clearing the copy of the program counter associated with the checkpoint.

In a variation of this embodiment, a predefined condition includes an independent load miss; an unresolvable data dependent predicted branch; a memory barrier or atomic instruction; a write of a cache line based on a prediction of the proper write status; a predetermined number of instructions passing in the speculative-execution mode; or a condition which has a high probability of forcing the processor to return to a checkpoint.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Processor

Figure 1:
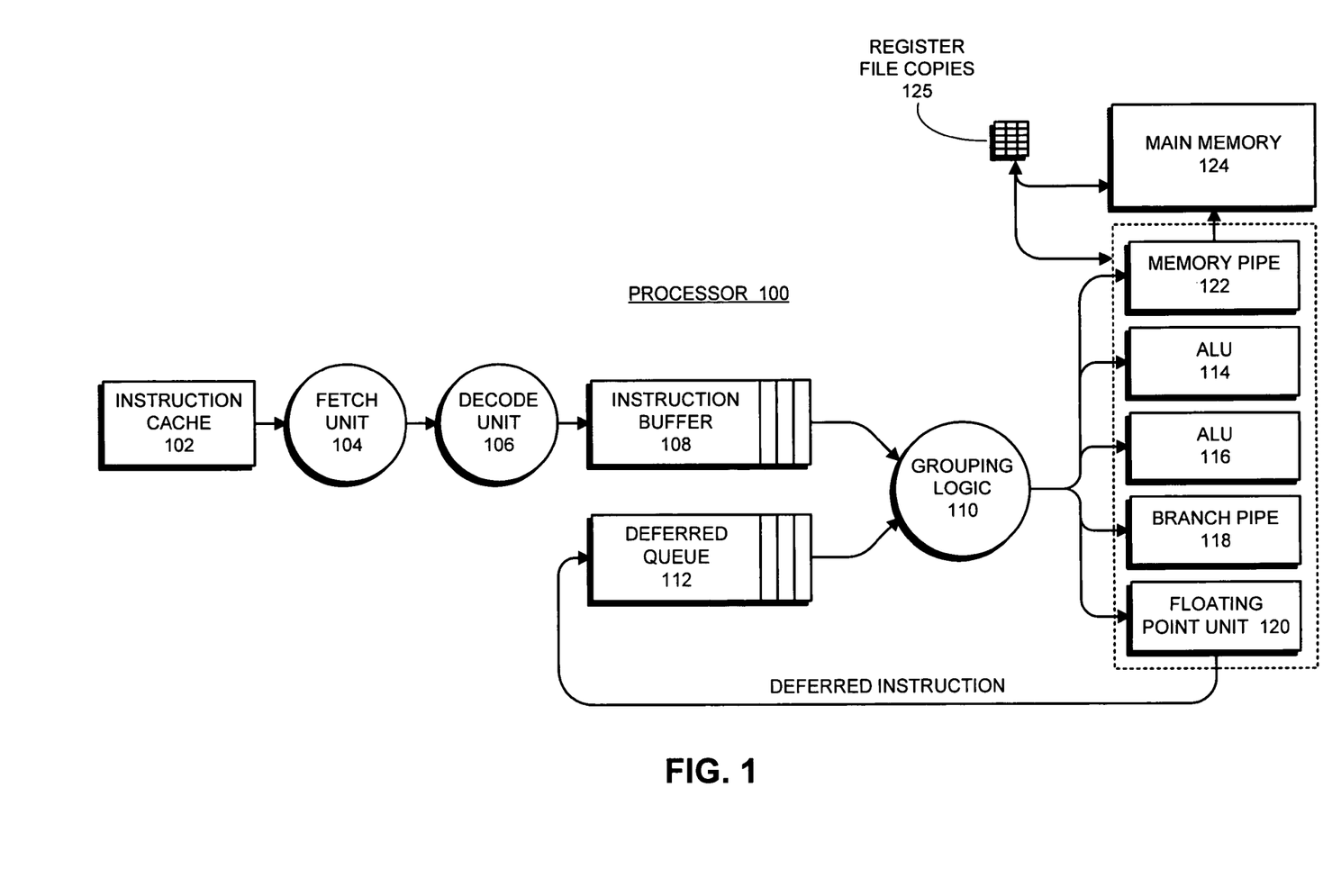
FIG. 1 illustrates the design of a processor that supports speculative-execution in accordance with an embodiment of the present invention.

FIG. 1 illustrates the design of a processor 100 that supports speculative-execution in accordance with an embodiment of the present invention. Processor 100 can generally include any type of processor, including, but not limited to, a microprocessor, a mainframe computer, a digital signal processor, a personal organizer, a device controller, and a computational engine within an appliance. As is illustrated in FIG. 1, processor 100 includes: instruction cache 102, fetch unit 104, decode unit 106, instruction buffer 108, deferred queue 112, grouping logic 110, main memory 124, arithmetic logic unit (ALU) 114, ALU 116, branch pipe 118, and floating point unit 120.

Processor 100 also includes register file copies 125. Register file copies 125 include a number of copies of processor 100's register file—one copy of each register for the committed architectural value and a copy of each register for every checkpoint processor 100 can set while executing in execute-ahead mode 203 (see FIG. 2). The latter register file copies hold the values speculatively written to the register file following the generation of a checkpoint during execute-ahead mode 203. Processor 100 uses these register file copies to return to these checkpoints, if necessary.

Note that processor 100 has no single set "architectural register file." The register that holds the architecturally committed value can be in any one of the copies of the register file in register file copies 125. For example, in register file copies 504 (see FIG. 5C), the architecturally committed value (represented by "AC") for register R1 is in register file RF1, while the architecturally committed value for register R2 is in register file RF2. This mechanism allows processor 100 to "copy" the register file almost instantly by simply beginning to use the next copy of the register file. Processor 100 uses a pointer, "HR," to indicate which register file in register file copies 125 holds the committed architectural value for a register.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves conditional branch computations), and floating point unit 120.

If an instruction cannot be executed due to an unresolved data dependency, such as an operand that has not returned from a load operation, the system defers execution of the instruction and moves the instruction into deferred queue 112. Note that like instruction buffer 108, deferred queue 112 is also organized as a FIFO buffer.

When the data dependency is eventually resolved, instructions from deferred queue 112 are executed in program order with respect to other deferred instructions, but not with respect to other previously executed non-deferred instructions.

Speculative-Execution State Diagram

Figure 2:
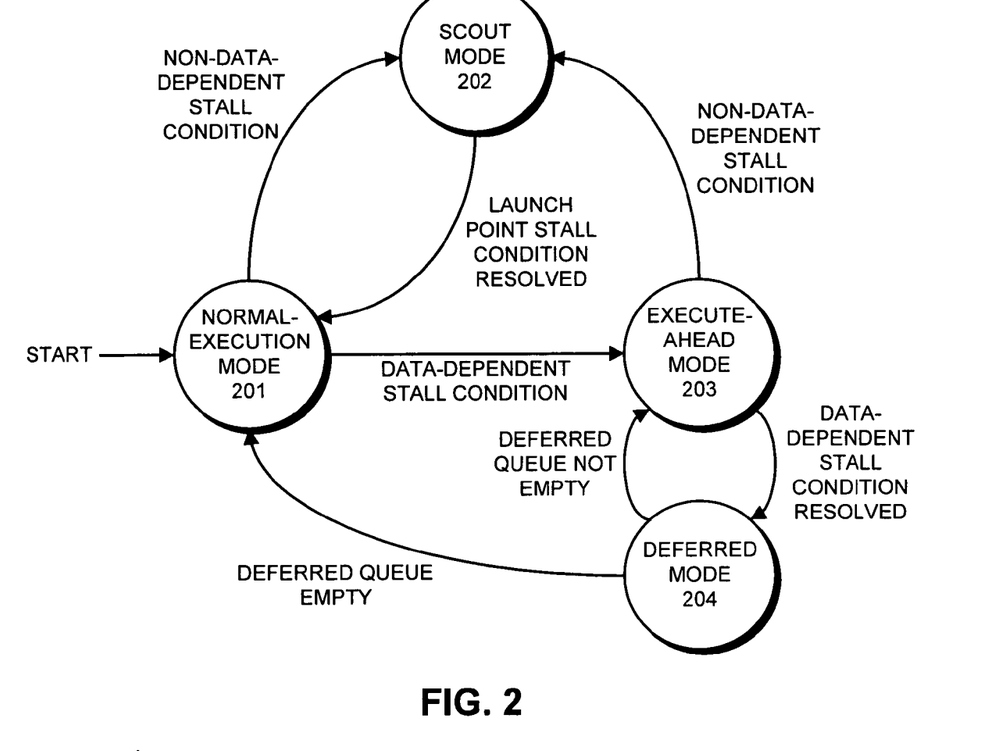
FIG. 2 presents a state diagram which includes a general depiction of execute-ahead mode, scout mode, and deferred mode in accordance with an embodiment of the present invention.

FIG. 2 presents a state diagram which includes a general depiction of execute-ahead mode 203, scout mode 202, and deferred mode 204 in accordance with an embodiment of the present invention.

The system starts in normal-execution mode 201, wherein instructions are executed in program order as they are issued from instruction buffer 108 (see FIG. 1).

Next, if an unresolved data dependency arises during execution of an instruction, the system moves to execute-ahead mode 203. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 203, the system generates a checkpoint that can be used, if necessary, to return execution of the process to the point where the unresolved data dependency was encountered; this point is referred to as the "launch point." (Note that generating the checkpoint involves saving the precise architectural state of processor 100 to facilitate subsequent recovery from exceptions that arise during execute-ahead mode 203 or deferred mode 204.) The system also "defers" execution of the instruction that encountered the unresolved data dependency by storing the instruction in deferred queue 112.

While operating in execute-ahead mode 203, the system continues to execute instructions in program order as they are received from instruction buffer 108, and any instruction that cannot execute because of an unresolved data dependency is deferred (which involves storing the instruction in deferred queue 112).

During execute-ahead mode 203, if an unresolved data dependency is finally resolved, the system moves into deferred mode 204, wherein the system attempts to execute instructions from deferred queue 112 in program order. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies by placing these again-deferred instruction back into deferred queue 112. On the other hand, the system executes other instructions that can be executed in program order with respect to each other.

After the system completes a pass through deferred queue 112, if deferred queue 112 is empty, the system moves back into normal-execution mode 201. This may involve committing changes made during execute-ahead mode 203 and deferred mode 204 to the architectural state of processor 100, if such changes have not been already committed. The return to normal mode can also involve throwing away the checkpoint generated when the system moved into execute-ahead mode 203 as well as checkpoints generated during execute-ahead mode.

On the other hand, if deferred queue 112 is not empty after the system completes a pass through deferred queue 112, the system returns to execute-ahead mode 203 to execute instructions from instruction buffer 108 from the point where the execute-ahead mode 203 left off.

If a non-data dependent stall condition (except for a load buffer full or store buffer full condition) arises while the system is in normal-execution mode 201 or execute-ahead mode 203, the system moves into scout mode 202. (This non-data-dependent stall condition can include: a memory barrier operation; or a deferred queue full condition.) In scout mode 202, instructions are speculatively executed to prefetch future loads, but results are not committed to the architectural state of processor 100.

Scout mode 202 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 202.

Unfortunately, computational operations performed during scout mode 202 are not committed to the architectural state of the processor, and hence need to be recomputed again upon returning to normal execution mode, which can require a large amount of computational work.

When the original "launch point" stall condition is finally resolved, the system moves back into normal-execution mode 201, and, in doing so, uses the previously generated checkpoint to resume execution from the launch point instruction that encountered the launch point stall condition. The launch point stall condition is the stall condition that originally caused the system to move out of normal-execution mode 201. For example, the launch point stall condition can be the data-dependent stall condition that caused the system to move from normal-execution mode 201 to execute-ahead mode 203, before moving to scout mode 202. Alternatively, the launch point stall condition can be the non-data-dependent stall condition that caused the system to move directly from normal-execution mode 201 to scout mode 202.

Returning to a Remote Checkpoint

Figure 3:
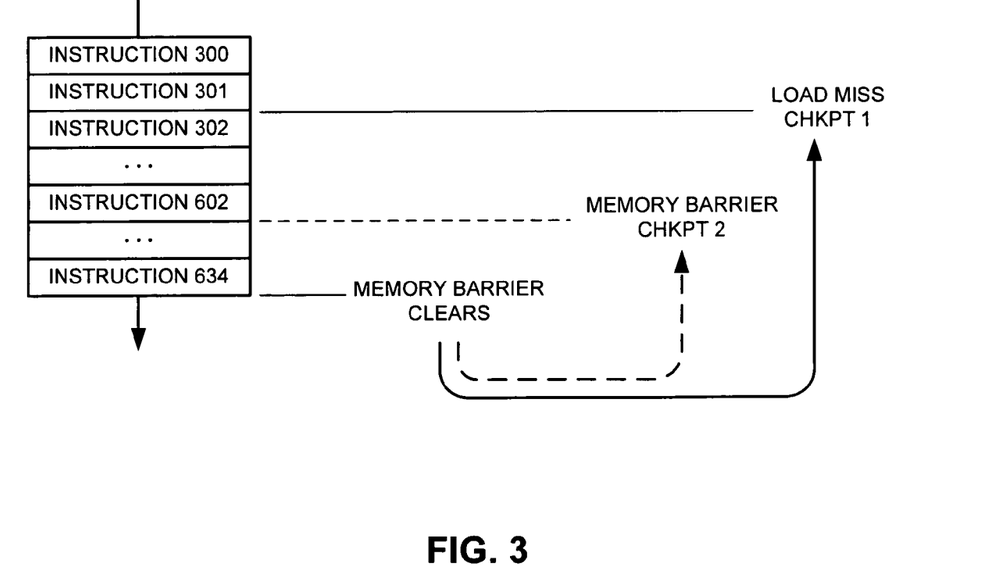
FIG. 3 presents a sequence of instructions which cause the processor to return to a remote checkpoint in accordance with an embodiment of the present invention.

FIG. 3 presents a sequence of instructions which cause processor 100 to return to a remote checkpoint in accordance with an embodiment of the present invention.

In FIG. 3, processor 100 executes instructions in program order starting with instruction 300. Instruction 301 causes a load miss, which in turn causes processor 100 to generate a checkpoint (CHKPT 1) and to commence executing instructions in execute-ahead mode 203 (see FIG. 2).

Processor 100 then executes instruction 302 followed by several hundred instructions in execute-ahead mode 203. Eventually processor 100 encounters a memory barrier instruction (instruction 602). Following the memory barrier instruction, processor 100 commences executing instructions in scout mode 202.

After processor 100 executes several dozen instructions in scout mode 202, the memory barrier instruction clears (at instruction 634). Processor then 100 exits from scout mode and returns to normal mode at CHKPT 1 (as indicated by the solid line in FIG. 3). Upon returning to CHKPT 1, processor 100 must re-execute the hundreds of instructions between CHKPT 1 and instruction 634, thereby losing a large amount of computational work.

In an embodiment of the present invention, processor 100 avoids the re-computation of almost all of these instructions by generating an additional checkpoint (CHKPT 2) when the memory barrier instruction is encountered. As indicated by the dashed line in FIG. 3, processor 100 must re-compute only a few dozen instructions upon returning to CHKPT 2—versus the more than 300 instructions that must be recomputed when returning from instruction 634 to CHKPT 1.

Note that the memory barrier instruction is a natural point to set CHKPT 2 because processor 100 must enter scout mode 202 whenever encountering a memory barrier instruction (thereby guaranteeing a return to a checkpoint). Note further that the memory barrier instruction is one of many conditions that serve as natural points for the generation of a checkpoint. In general, the group of conditions prompting the generation of a checkpoint includes any condition that is likely to cause processor 100 to return to a checkpoint.

Speculative-execution with Multiple Checkpoint Flowchart

Figure 4:
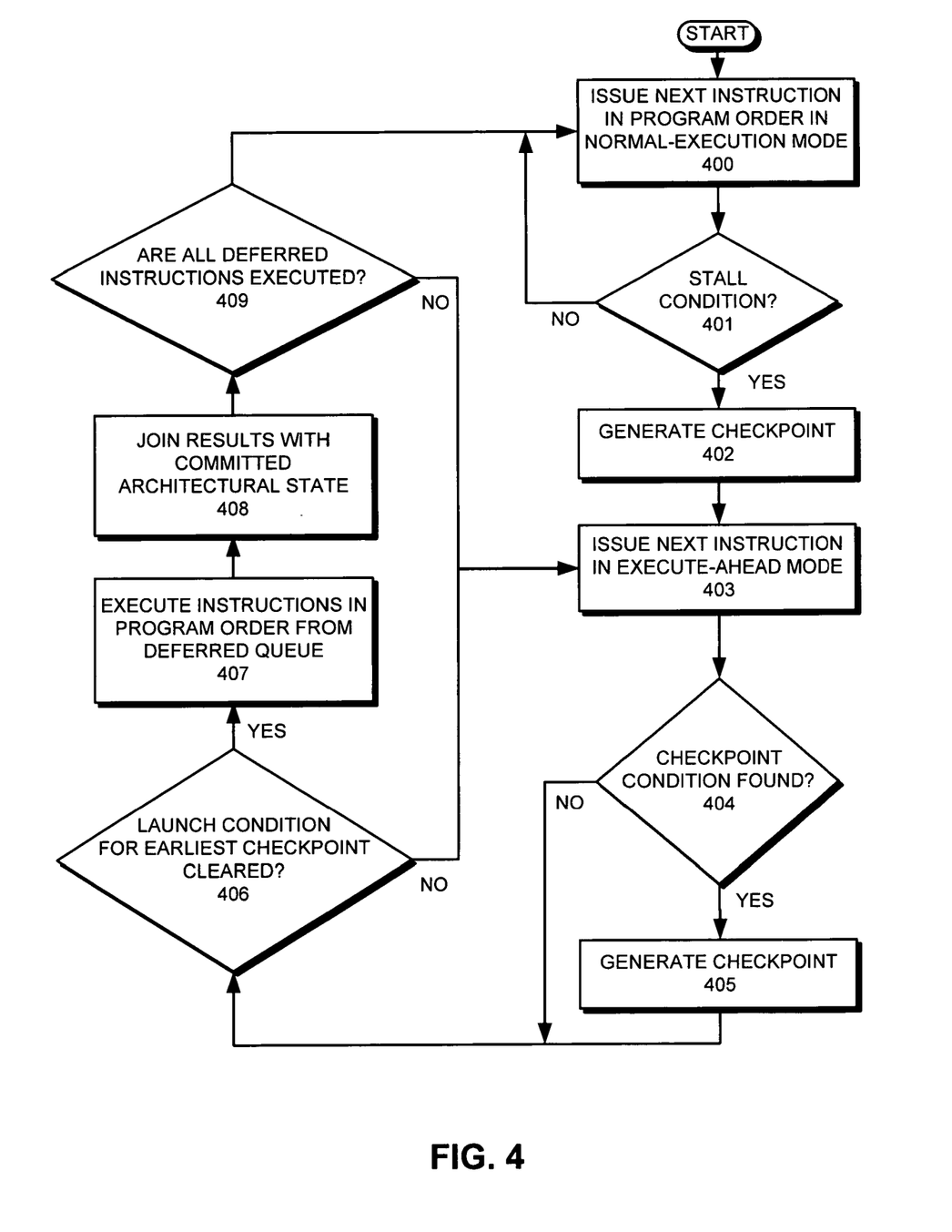
FIG. 4 presents a flow chart which illustrates the use of multiple checkpoints to avoid returning to a remote checkpoint in accordance with an embodiment of the present invention.

FIG. 4 presents a flow chart which illustrates the use of multiple checkpoints to avoid returning to a remote checkpoint in accordance with an embodiment of the present invention.

Processor 100 starts by executing instructions in program order in normal-execution mode (step 400). As long as the instruction is not a data-dependent stall condition (step 401), processor 100 returns to step 400 and issues the next instruction in normal-execution mode.

Upon encountering a data-dependent stall condition, processor 100 generates a checkpoint (step 402). When generating a checkpoint, processor 100 saves the current program counter, which allows the processor to return to the instruction which triggered the checkpoint. Additionally, processor 100 tags the contents of the store buffer with the checkpoint id, which prevents the speculative stores from draining from the store buffer during execute-ahead mode, and copies the register file to a shadow copy. Note that copying the register file to a shadow copy does not involve a true "copy" operation; processor 100 simply begins using the next copy of the register file, thereby saving the preceding copy (see FIG. 5A-5C).

Processor 100 then issues the next instruction in execute-ahead mode (step 403). If this instruction causes a checkpoint condition (step 404), processor 100 generates another checkpoint (step 405). Conditions that can trigger the generation of an additional checkpoint include; an independent load miss; a predicted branch instruction with an unresolvable data dependency; a memory barrier or atomic instruction; a write-predicted cache line; or an instruction where the number of instructions executed since the previous checkpoint is large.

Whether or not an additional checkpoint is generated, processor 100 determines if the data-dependent stall condition which caused the earliest remaining checkpoint has cleared (step 406). Note that the checkpoints (or the data-dependent stall conditions which caused the checkpoints to be generated) must retire in FIFO order to avoid the risk of data dependency errors. If the data-dependent stall condition has not cleared, processor 100 issues the next instruction in execute-ahead mode (step 403).

If the data-dependent stall condition has cleared, processor 100 enters deferred mode 204 and commences the execution of instructions from deferred queue 112 (step 407). When all the deferred instructions associated with the data-dependent stall condition have cleared, processor 100 performs a "join" operation to merge the results of speculative execution into the committed architectural state (step 408). The join operation involves updating the HR pointer to indicate the copy of the register written during the checkpoint (see FIGs. 5A-5C); releasing the stores which were held up by this checkpoint from the store buffer to the cache; clearing the copy of the program counter associated with the checkpoint; and updating the state machine used to perform register writing operations following the generation of the checkpoint.

When the join operation is completed, processor 100 determines if the deferred queue is empty (step 409). If so, processor 100 returns to step 400 and issues the next instruction in program order in normal-execution mode. Alternatively, if the deferred queue is not empty, processor 100 returns to step 403 and issues the next instruction in execute-ahead mode.

Register File Copies

Figure 5A:
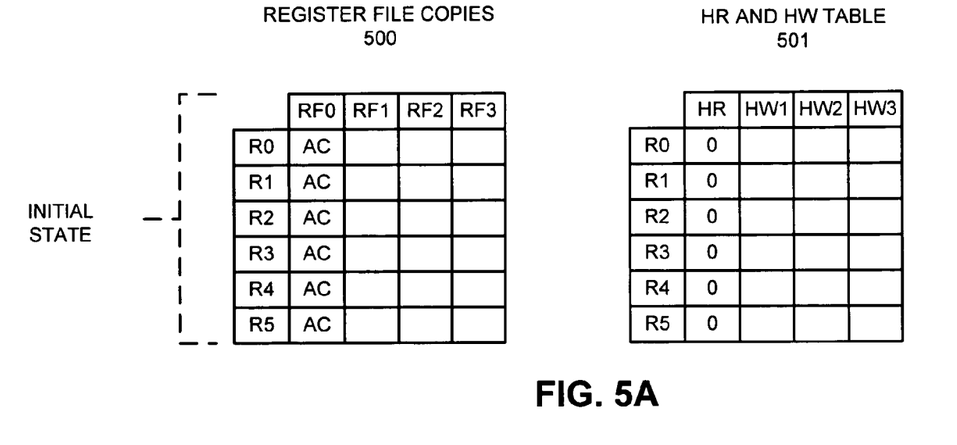
FIG. 5A illustrates a group of register file copies and an associated table in an initial state in accordance with an embodiment of the present invention.
Figure 5B:
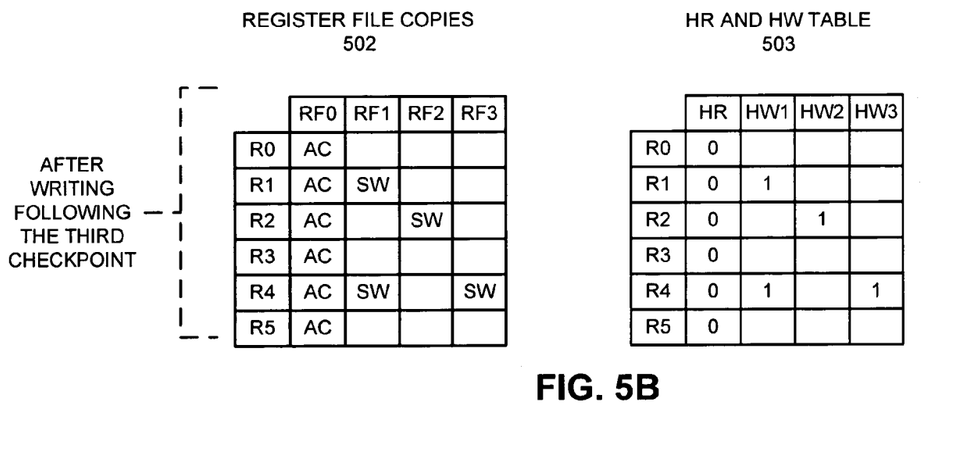
FIG. 5B illustrates a group of register file copies and an associated table after generating the third checkpoint in execute-ahead mode in accordance with an embodiment of the present invention.
Figure 5C:
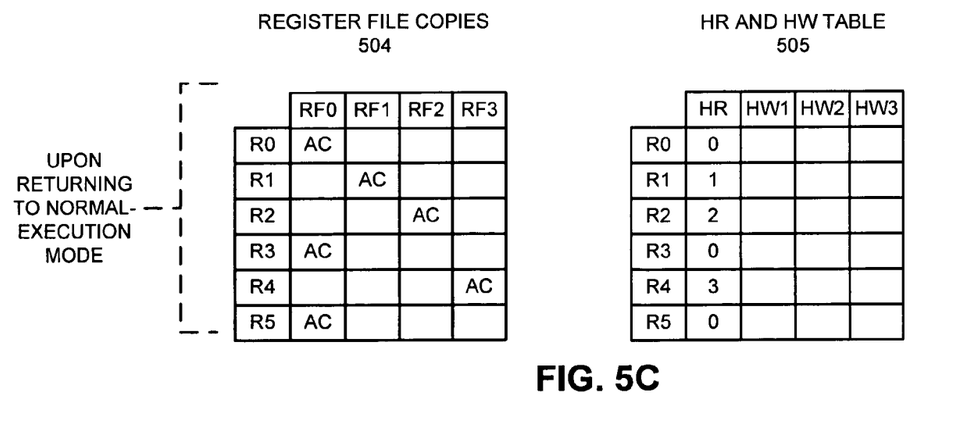
FIG. 5C illustrates a group of register file copies and an associated table upon returning to normal-execution mode in accordance with an embodiment of the present invention.

FIGS. 5A-5C illustrate a time progression of register file copies and an associated table of pointers and values in accordance with an embodiment of the present invention. In FIG. 5A the register file copies and associated table are in an initial state, in FIG. 5B they are in an intermediate state, and in FIG. 5C they are in the final state.

Register file copies 500, 502 and 504 are comprised of multiple copies of processor 100's register file. The total number of register file copies is equivalent to the number of possible checkpoints (in this case 3) plus one copy for the committed architectural values. For purposes of illustration, the actual registers in the register file copies are represented by R1-R5.

HR and HW table 501, 503 and 505 are comprised of an HR pointer and 3 variables (HW1-HW3) for each register in register file copies 500, 502 and 504, respectively. The HR pointer is used by processor 100 to indicate which register in the register file copies holds the committed architectural value. There is an HW variable for each possible checkpoint (HW1, HW2 and HW3). Processor 100 sets a given HW variable when the related register is speculatively written following the generation of an associated checkpoint in execute-ahead mode. For example, HW1 and HW3 are set for register R4 in HR and HW table 503, while the AC value is in register file RF0. This indicates that processor 100 wrote to register R4 following the generation of the first checkpoint (data stored in register file RF1) and again following the generation of the third checkpoint (data stored in register file RF3).

When writing to a register, processor 100 uses a combination of the HR pointer and an offset value to locate the register in the proper register file copy. Processor 100 maintains the offset value in a state machine. Upon generating each checkpoint in execute-ahead mode, processor 100 increments the state machine, thereby increasing the size of the offset. When locating the register, processor 100 starts at the copy of the register file indicated by the HR pointer, then shifts a number of register file copies equal to the offset value. In normal-execution mode the offset is zero (processor 100 has generated no checkpoints), so the processor 100 writes to the register indicated by the HR pointer. Conversely, in execute-ahead mode, the offset value is non-zero so processor 100 writes to the register file copy indicated by the HR pointer plus the offset value. For example, because processor 100 is operating in execute-ahead mode following the generation of the third checkpoint in FIG. 5B, processor 100 writes to the third copy of the register file from the register file indicated by the HR pointer (as seen by the write to register R4 in register file RF3).

When reading from a register, processor 100 uses the formula (HR+HW) % 4 to locate the proper register file copy. During normal-execution mode, none of the HW variables are set, so processor 100 simply reads from the register indicated by the HR pointer. Alternatively, during speculative-execution, one or more of the HW variables for the register may be set. Although multiple HW variables can be set, processor 100 only uses the most recently set HW. For example, in FIG. 5B, HW1 and HW3 are both set for register R4, but processor 100 only uses HW3 in the formula. Hence, processor 100 uses 0+3% 4=3, indicating that processor 100 should read register file RF3.

In order to more clearly illustrate the writing and reading process, register R4 is followed as processor 100 progresses from normal-execution mode, through speculative-execution, and back to normal-execution mode in FIGS. 5A-5C.

In FIG. 5A register file copies 500 and HR and HW table 501 are in an initial state (as if processor 100 had just begun executing instructions in normal-execution mode from power-up). The architecturally committed value for register R4 is held in register file RF0 in register file copies 500. Register R4's HR pointer is pointed at RF0, as shown by the "0" in the HR field of HR and HW table 501. In addition, all HW values for register R4 are unset, as seen in HR and HW table 501.

In FIG. 5B register file copies 502 and HR and HW table 503 illustrate the state of register R4 following execution in execute-ahead mode when all three checkpoints have been set. As seen in register file copies 502, register R4 was speculatively written "SW" once following the first checkpoint (register file RF1) and then again following the third checkpoint (register file RF3). HW1 and HW3 are both set in HR and HW table 503, indicating the speculative writes. Processor 100 is still executing instructions in execute-ahead mode following the third checkpoint and the speculative writes have not been committed to the architectural state of the processor. Hence, Register R4's HR pointer still points at register file RF0 in HR and HW table 503.

In FIG. 5C register file copies 504 and HR and HW table 505 illustrate the state of register R4 upon returning to normal-execution mode. Since all the checkpoints have successfully cleared, processor 100 has joined the results of speculative-execution with the architecturally committed values. The HR pointer indicates that the architecturally committed value for register R4 is held in register file RF3, the location of the last speculative write, and the HW variables in HR and HW table 505 have been unset.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for creating multiple checkpoints in a processor that supports speculative-execution, comprising:
   issuing instructions for execution in program order during execution of a program in a normal-execution mode;
   upon encountering a launch condition during an instruction which causes a processor to enter execute-ahead mode, performing an initial checkpoint and commencing execution of instructions in a execute-ahead mode, wherein instructions that cannot be executed because of the unresolved data dependency are deferred, and wherein other non-deferred instructions are executed in program order;
   upon encountering a predefined condition during execute-ahead mode,
      generating an additional checkpoint, and
      continuing to execute instructions in execute-ahead mode,
   wherein generating the additional checkpoint allows the processor to return to the additional checkpoint, instead of the previous checkpoint, if the processor subsequently encounters a condition that requires the processor to return to a checkpoint, thereby preventing the processor from having to re-execute instructions between the previous checkpoint and the additional checkpoint; and
   upon encountering a non-data-dependent stall condition in normal-execution mode or in execute-ahead mode, commencing execution of instructions in scout-mode, wherein instructions are speculatively executed to prefetch future loads without committing the results of the instructions to the architectural state of the processor;
   wherein the processor includes N copies of a register file, wherein each register has a HR pointer that indicates which copy of the register file contains the architecturally committed version of the register and an HW variable for each potential checkpoint, wherein the processor sets a corresponding HW variable when the register is speculatively written following the generation of a checkpoint;
   wherein reading from a register in normal-execution mode, execute-ahead mode, or scout mode involves determining which register to read from by computing (HR+HW) % N, wherein HW is either zero or equal to a value of a checkpoint after which a most recently set HW variable was set for the register.

2. The method of claim 1, wherein the number of copies N of the register file is equal to the number of checkpoints supported by the processor, plus one for the architecturally committed copy of the register file.

3. The method of claim 2, wherein the HR pointer for each register may point at a different copy of the register file.

4. The method of claim 3, wherein the processor maintains a state machine which holds an offset value specifying the number of checkpoints that have been generated, and wherein the offset value is zero during normal-execution mode.

5. The method of claim 4, wherein when writing to a register, the processor locates the register within the copies of the register file using the HR pointer and the offset value.

6. The method of claim 4, wherein generating a checkpoint involves:
   storing the program counter;
   advancing the state machine; and
   tagging store buffer entries with pending stores with a checkpoint identifier which causes the processor to block global visibility of stores generated during speculative execution.

7. The method of claim 6, wherein when the condition which caused the processor to take the checkpoint clears, the processor "joins" the results of the instructions executed in speculative-execution mode with the current architectural state of the processor by:
   shifting the HR pointer for each register to point at the register file copy used during the checkpoint if the associated HW variable for that register is set;
   unsetting the associated HW variables;
   releasing the store buffer entries associated with this checkpoint to become globally visible; and
   clearing the copy of the program counter associated with the checkpoint.

8. The method of claim 1, wherein a predefined condition includes:
   an independent load miss;
   an unresolvable data dependent predicted branch;

a memory barrier or atomic instruction;
a write of a cache line based on a prediction of the proper write status;
a predetermined number of instructions passing in the speculative-execution mode; or
a condition which has a high probability of forcing the processor to return to a checkpoint.

9. An apparatus for creating multiple checkpoints in a processor that supports speculative-execution, comprising:
an execution mechanism within the processor;
wherein the execution mechanism is configured to issue instructions for execution in program order during execution of a program in a normal-execution mode;
upon encountering a launch condition during an instruction which causes a execution mechanism to enter execute-ahead mode, the execution mechanism is configured to perform an initial checkpoint and commence execution of instructions in a execute-ahead mode, wherein instructions that cannot be executed because of the unresolved data dependency are deferred, and wherein other non-deferred instructions are executed in program order;
upon encountering a predefined condition during execute-ahead mode, the execution mechanism is configured to
generate an additional checkpoint, and
continue to execute instructions in execute-ahead mode,
wherein generating the additional checkpoint allows the execution mechanism to return to the additional checkpoint, instead of the previous checkpoint, if the execution mechanism subsequently encounters a condition that requires the execution mechanism to return to a checkpoint, thereby preventing the execution mechanism from having to re-execute instructions between the previous checkpoint and the additional checkpoint; and
upon encountering a non-data-dependent stall condition in normal-execution mode or in execute-ahead mode, the execution mechanism is configured to commence execution of instructions in scout-mode, wherein instructions are speculatively executed to prefetch future loads without committing the results of the instructions to the architectural state of the processor;
wherein the processor includes N copies of a register file, wherein each register has a HR pointer that indicates which copy of the register file contains the architecturally committed version of the register and an HW variable for each potential checkpoint, wherein the processor sets a corresponding HW variable when the register is speculatively written following the generation of a checkpoint;
wherein when reading from a register in normal-execution mode, execute-ahead mode, or scout mode, the execution mechanism is configured to determine which register to read from by computing (HR+HW) % N, wherein HW is either zero or equal to a value of a checkpoint after which a most recently set HW variable was set for the register.

10. The apparatus of claim 9, wherein the number of copies N of the register file is equal to the number of checkpoints supported by the execution mechanism, plus one for the architecturally committed copy of the register file.

11. The apparatus of claim 10, wherein the HR pointer for each register may point at a different copy of the register file.

12. The apparatus of claim 11, wherein the execution mechanism is configured to maintain a state machine which holds an offset value specifying the number of checkpoints that have been generated, and wherein the offset value is zero during normal-execution mode.

13. The apparatus of claim 12, wherein when writing to a register the execution mechanism is configured to locate the register within the copies of the register file using the HR pointer and the offset value.

14. The apparatus of claim 12, wherein the execution mechanism is configured to generate a checkpoint by:
storing the program counter;
advancing the state machine; and
tagging store buffer entries with pending stores with a checkpoint identifier which causes the execution mechanism to block global visibility of stores generated during speculative execution.

15. The apparatus of claim 14, wherein when the condition which caused the execution mechanism to take the checkpoint clears, the execution mechanism is configured to "join" the results of the instructions executed in speculative-execution mode with current the architectural state of the execution mechanism by:
shifting the HR pointer for each register to point at the register file copy used during the checkpoint if the associated HW variable for that register is set;
unsetting the associated HW variables;
releasing the store buffer entries associated with this checkpoint to become globally visible; and
clearing the copy of the program counter associated with the checkpoint.

16. The apparatus of claim 9, wherein the execution mechanism is configured so that a predefined condition includes:
an independent load miss;
an unresolvable data dependent predicted branch;
a memory barrier or atomic instruction;
a write of a cache line based on a prediction of the proper write status;
a predetermined number of instructions passing in the speculative-execution mode; or
a condition which has a high probability of forcing the processor to return to a checkpoint.

* * * * *